United States Patent [19]
Loo

[11] Patent Number: 5,522,629
[45] Date of Patent: Jun. 4, 1996

[54] REVERSIBLE RAKE AND SHOVEL IMPLEMENT

[76] Inventor: Orin W. Loo, 744 Count Pourtales Dr., Colorado Springs, Colo. 80906

[21] Appl. No.: 373,545

[22] Filed: Jan. 17, 1995

[51] Int. Cl.⁶ ................................. A01B 1/20; E01H 5/02
[52] U.S. Cl. ..................... 294/51; 56/400.04; 294/54.5; 294/58
[58] Field of Search .................. 294/49, 51, 52, 294/53.5, 54.5, 55, 56, 58; 15/236.01, 236.08, 257.7; 37/241, 265, 267, 268, 284, 285; 56/400.04, 400.05, 400.07, 400.11; 172/371–373, 375, 378, 381

[56] References Cited

U.S. PATENT DOCUMENTS

| | | | |
|---|---|---|---|
| 827,542 | 7/1906 | Lawson | 294/54.5 X |
| 1,066,562 | 7/1913 | Wilkins | 294/54.5 |
| 1,572,824 | 2/1926 | Tatge | 37/268 X |
| 1,650,428 | 11/1927 | Chinneck | 294/52 |
| 1,693,472 | 11/1928 | Batty | 294/54.5 X |
| 2,256,953 | 9/1941 | Smith | 37/284 X |
| 3,727,964 | 4/1973 | Nordvik | 294/51 X |
| 4,559,726 | 12/1985 | Moisan | 294/53.5 X |
| 5,205,122 | 4/1993 | Wong | 294/51 X |

FOREIGN PATENT DOCUMENTS

| | | | |
|---|---|---|---|
| 71519 | 12/1942 | Czechoslovakia | 37/265 |
| 809066 | 2/1959 | United Kingdom | 294/58 |

*Primary Examiner*—Johnny D. Cherry
*Attorney, Agent, or Firm*—William J. Kubida; Holland & Hart

[57] ABSTRACT

A reversible ansate implement includes a generally elongate handle having opposite distal and proximal ends thereof. A scoop presenting a substantially concave material facing surface thereof communicating between a handle attachment edge and an oppositely disposed material intercepting edge may be selectively and reversibly coupled at its handle attachment edge to the distal end of the elongate handle. In use, the material facing surface of the scoop may be selectively positioned both toward and away from the elongate handle as required for the particular application, and in a particular embodiment, a combined rake and shovel is disclosed having a reversible scoop which may be selectively reversed with respect to a common elongate handle in order to allow a user thereof to either pull or push material with the concave facing surface of the scoop. A lifting handle and turning grip may be added to the elongate handle to facilitate lifting and dumping of material held in the scoop with the aid of an additional end panel.

3 Claims, 2 Drawing Sheets

REVERSIBLE RAKE AND SHOVEL IMPLEMENT

BACKGROUND OF THE INVENTION

The present invention relates, in general, to a manually operable, reversible ansate implement. More particularly, the present invention relates to a combined rake and shovel having a reversible scoop which may be selectively reversed with respect to a common elongate handle in order to allow a user thereof to either pull or push material with the concave facing surface of the scoop. In a particular embodiment, the reversible implement disclosed herein may be used to manually plow (or push) snow and, alternatively, rake leaves, soil or other similar materials.

Numerous gardening and material moving implements are commercially available and all are generally designed with but a single intended purpose or application. As a consequence, each is manufactured to be configured in only one specific, predetermined form and is uniquely adapted to a specific task. Because of the unique application of each implement, users must then purchase a specialized tool for each specific task resulting, for example, in a plethora of various types of shovels and rakes with a concomitant increase in expense in their acquisition and storage requirements. Moreover, not only does the manufacturer of these various implements require specific tooling for the production of each, adding to the manufacturing and retail costs for each item, such application specific implements are not readily amenable to packaging and shipping in quantity, even when boxed in an unassembled state.

It would therefore be highly desirable to provide a single, multipurpose implement which can be readily configured by a user to function as more than one type of household implement, for example, a snow removal shovel and leaf, vegetation or soil rake depending upon the requirements of the task at hand. Such a multipurpose implement would necessitate the purchase and storage of less items. Advantageously, the implement would also be easily configurable utilizing a single reversible scoop which may be selectively affixed to a single elongate handle while simultaneously requiring a minimum of tooling for manufacture of its constituent elements and resulting in a unit that may be economically manufactured and stacked for packaging and shipment in an unassembled condition.

SUMMARY OF THE INVENTION

Broadly, what has been provided is a reversible ansate implement which comprises a generally elongate handle having opposite distal and proximal ends thereof. A scoop presenting a substantially concave material facing surface thereof communicating between a handle attachment edge and an oppositely disposed material intercepting edge is reversibly coupled to the scoop at the handle attachment edge to the distal end of the elongate handle. In use, the material facing surface of the scoop may be selectively positioned both toward and away from the elongate handle as required for the particular application.

In a more particular embodiment, the elongate handle may further include an upwardly extending lifting handle secured thereto at a point medial of its distal and proximal ends. In conjunction with the lifting handle, an upwardly extending grip may also be secured to the elongate handle at a point medial of said lifting handle and the proximal end of the elongate handle. The lifting handle and grip facilitate the lifting of the reversible ansate implement and the off-loading of material from the scoop at an open end thereof.

Still further, the scoop may additionally include an end panel communicating between its handle attachment and material intercepting edges, with the end panel presenting a material holding surface thereof to increase the holding capacity of the scoop. A material gathering edge element of aluminum or like material may also be removably secured adjacent to the material intercepting edge of the scoop when the implement is utilized as a rake being drawn toward a user thereof.

BRIEF DESCRIPTION OF THE DRAWINGS

The foregoing and other features and objects of the present invention will become more apparent and the invention itself will be best understood by reference to the following description of a preferred embodiment, taken in conjunction with the accompanying drawings, wherein.

DESCRIPTION OF A PREFERRED EMBODIMENT

Figure 1:
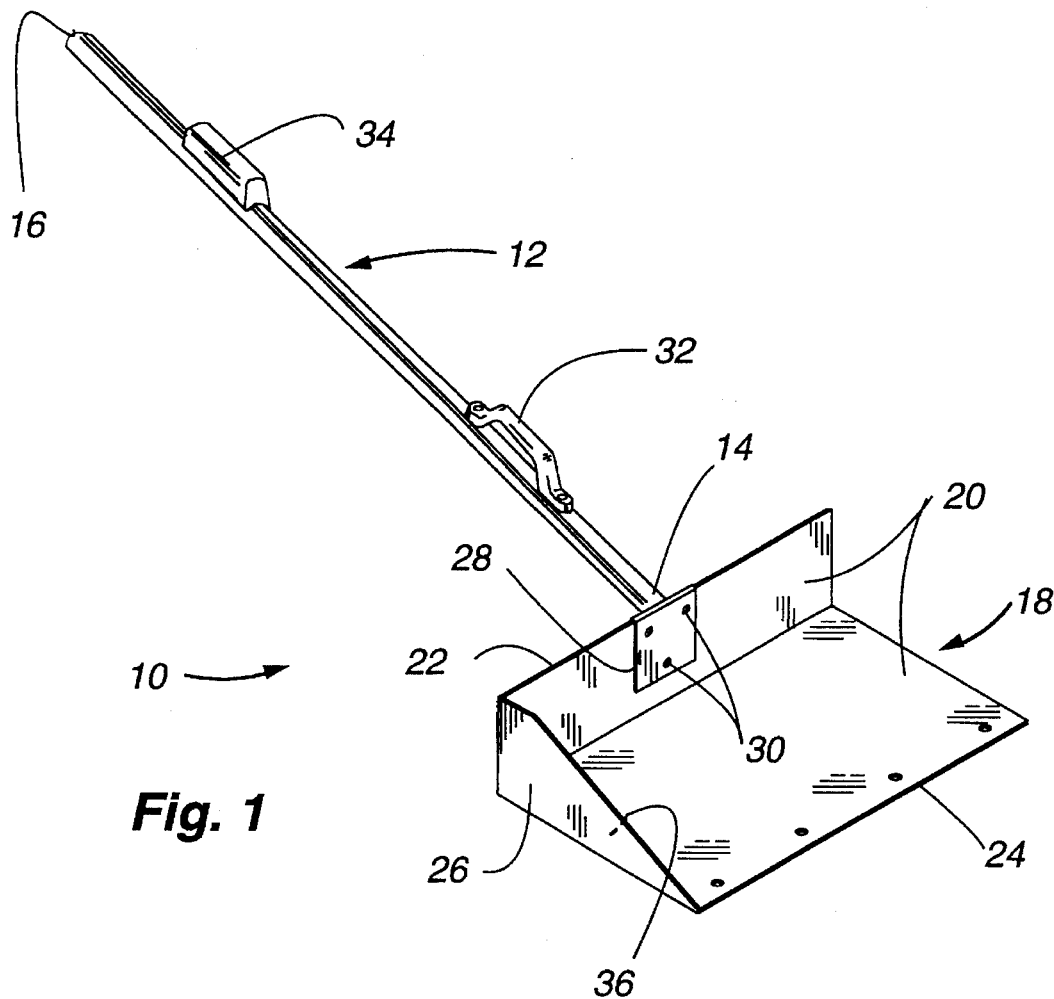
FIG. 1 is an isometric view of a reversible ansate implement in accordance with the present invention illustrating its possible configuration as a snow shovel and further depicting a lifting handle positioned toward the distal end of the elongate handle and an additional grip disposed toward the proximal end thereof.

With reference now to FIG. 1, a reversible ansate implement 10 in accordance with the present invention is shown. The implement 10 comprises, in pertinent part, a generally elongate handle 12 extending to a distal end 14 from an opposite proximal end 16. In a preferred embodiment, the elongate handle 12 may comprise a wooden, aluminum or other suitable structural material pole.

The implement 10 further comprises a scoop 18 which may comprise a pair of perpendicularly disposed material facing surfaces 20 as shown or a single curvilinear scoop 18 having a substantially hemispherical or frustoconical cross section to provide a concave surface therein. In a preferred embodiment, the scoop 18 may be constructed of light weight but strong plastic, aluminum, or other material which is light weight and generally impervious to heat and moisture.

The scoop 18 extends from a handle attachment edge 22 to a material intercepting edge 24 as shown. An optional end panel 26 may communicate between the handle attachment edge 22 and the material intercepting edge 24 to present a material holding surface 36 useful in conjunction with the material facing surfaces 20 to facilitate retention of material within the scoop 18 when utilized, for example, as a snow shovel or rake implement.

The scoop 18 may be secured to the elongate handle 12 by means of a bracket 28 which is itself secured adjacent the distal end 14 of the elongate handle 12. The bracket 28, in conjunction with a number of bolts or screws 30, comprises a lock for holding the scoop 18 with respect to the elongate handle 12 and may be made of a hardened metal suitable for preventing the scoop 18 from turning with respect to the elongate handle 12 when in use. The attachment of the scoop 18 to the elongate handle 12 shown is only one possible implementation thereof and a number of other techniques for reversibly maintaining the scoop 18 with respect to the elongate handle 12 will suggest themselves to those skilled in the art. The actual construction of the bracket 28 illustrated in FIG. 1 will be more fully described hereinafter.

The elongate handle 12 may also be furnished with an additional lifting handle 32 upwardly displaced along the elongate handle 12 toward the distal end 14 thereof. The lifting handle 32, which may comprise a conventional brass handle or other similar element, may be affixed to the elongate handle 12 by a plurality of screws, clamps, or other known attachment techniques. A grip 34 may also be disposed along the length of elongate handle 12 toward the proximal end 16 thereof. The grip 34, which may comprise a rubber grip or a wood element either turned on the elongate handle 12 or otherwise affixed thereto, may be utilized in conjunction with the lifting handle 32 to facilitate easy lifting of the implement 10 when filled with a particular material as well as allowing for the imparting of a turning motion to the elongate handle 12 to facilitate the dumping of material maintained by the material facing surfaces 20 and material holding surface 36 by positioning an open end of the scoop 18 toward a location at which the material is desired to be deposited.

Figure 2:
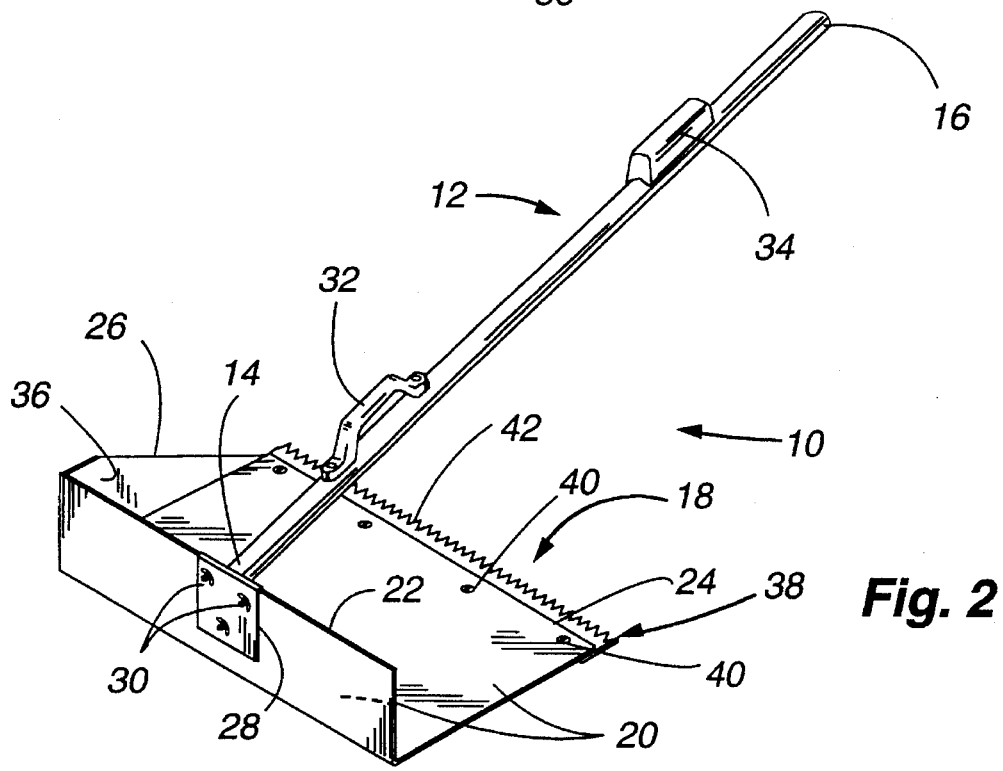
FIG. 2 is an additional isometric view of the reversible ansate implement of FIG. 1 illustrating the common elongate handle and scoop thereof having been reconfigured to provide, in conjunction with an optional, serrated material gathering edge element, a leaf, vegetation or soil rake.

With reference additionally now to FIG. 2, the implement 10 of FIG. 1 is shown wherein the scoop 18 has been reversed such that the material intercepting edge 24 thereof faces toward the proximal end 16 of the elongate handle 12 instead of away therefrom as shown in the preceding figure. In this configuration, the implement 10 may be utilized by a user to rake leaves, other vegetation, or soil in conjunction with an optional material gathering edge element 38 affixed to the material intercepting edge 24 of the scoop 18. The edge element 38, which may comprise an aluminum or other metal serrated edge, is affixed to the material intercepting edge 24 of the scoop 18 by means of a number of fasteners 40. The edge element 38 includes a number of serrations 42 which facilitate the utilization of the implement 10 as a raking unit.

As with the configuration of the implement 10 shown in the preceding figure, and when utilized as a rake, the implement 10 can be manipulated by a user such that the material gathered within the scoop 18 is maintained by the material facing surfaces 20 and the material holding surface 36 such that the material contained within the scoop may be carried to a location at which it is to be deposited and allowed to slide out of the scoop 18 at an open end thereof opposite the end panel 26. The optional lifting handle 32 and grip 34 allow a user to easily lift the implement 10 and rotate the elongate handle 12 to accurately deposit the material raked.

Figure 3:
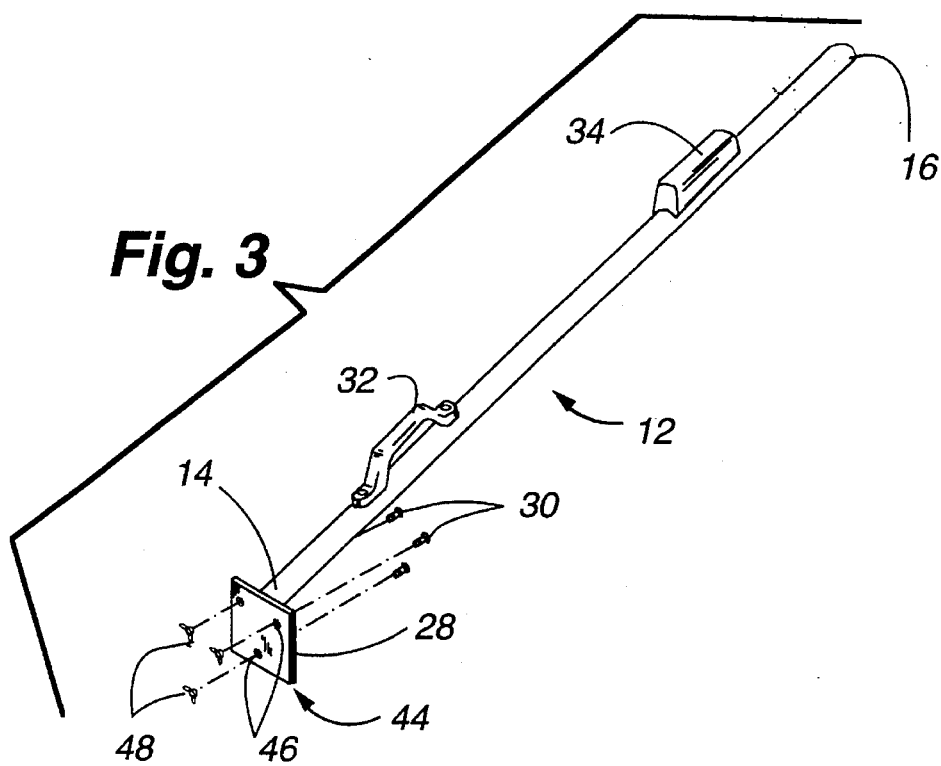
FIG. 3 is a further isometric view of the elongate handle illustrated in the preceding figures depicting a possible implementation of a bracket for reversibly coupling the dual purpose scoop to the common elongate handle using a channel for retaining the scoop at a handle attachment edge thereof by means of a number of screws and threadably engaging wing-nuts.

With additional reference to FIG. 3, the elongate handle 12 of the preceding figures is shown to further illustrate one possible implementation of the bracket 28 affixed to the distal end 14 thereof. The bracket 28 may comprise a channel 44 having a substantially "U" shaped cross section for engaging the handle attachment edge 22 of the scoop 18. The bracket 28 further comprises a number of holes 46 communicating therethrough and into which a corresponding number of bolts or screws 30 may extend in conjunction with a likewise corresponding number of wing-nuts 48.

Figure 4A:
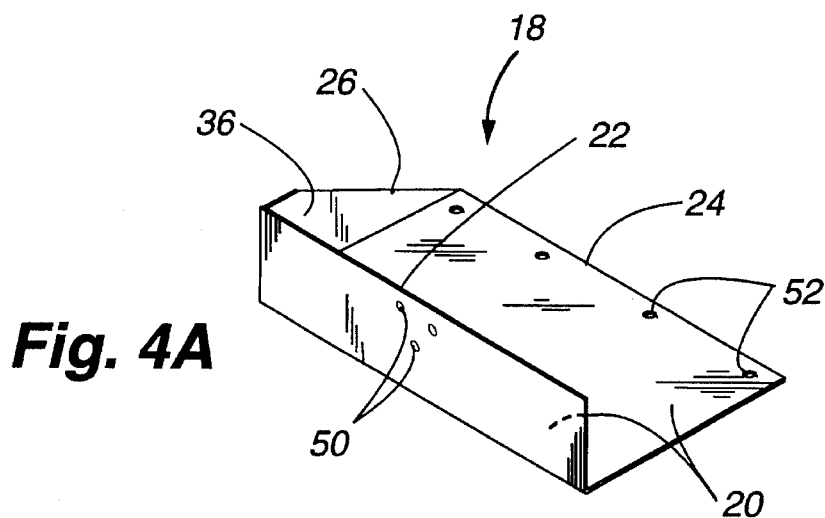
FIG. 4A is an additional isometric view of the dual purpose scoop of FIGS. 1 and 2 and illustrating the end panel and attachment holes thereof for securing the scoop to the bracket of FIG. 3 as well as an optional serrated material gathering edge element.

With additional reference now to FIG. 4A, the scoop 18 is shown illustrating a number of bracket mounting holes 50 corresponding to the holes 46 in the bracket 28 through which the bolts or screws 30 may extend to secure the scoop 18 to the generally elongate handle 12 by means of a number of wing-nuts 48. Further illustrated in this Figure are a number of edge element mounting holes 52 disposed adjacent the material intercepting edge 24 of the scoop 18.

Figure 4B:
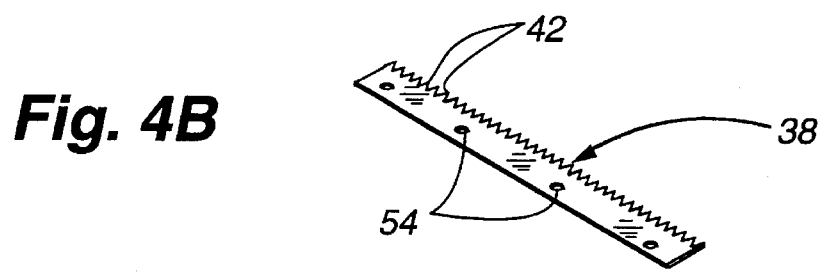
FIG. 4B is a top plan view of an optional serrated material gathering edge element for possible attachment to the material intercepting edge of the dual purpose scoop, for example, when the reversible ansate implement is utilized as a rake.

With additional reference now to FIG. 4B, the material gathering edge element 38 is shown as presenting a corresponding number of holes 54 for alignment with the edge element mounting holes 52 of the scoop 18. A number of fasteners 40 which may comprise a number of bolts or screws and corresponding wing-nuts similar to those utilized to attach the scoop 18 to the bracket 28 may be utilized.

The implement 10 disclosed herein may be readily manufactured and packaged and uses a dual purpose scoop 18 in conjunction with a common elongate handle 12. The unit may be easily manufactured and shipped in large quantities due to the fact that the design of the scoop 18 allows for the nesting of a number of such scoops. The additional hardware comprising bolts and wing-nuts may also be common to the attachment of the scoop 18 to the bracket 28 as well as the attachment of the edge element 38 to the material intercepting edge 24 of the scoop 18.

What has been provided therefor is a reversible ansate implement which includes a generally elongate handle having opposite distal and proximal ends thereof. A scoop presenting a substantially concave material facing surface thereof communicating between a handle attachment edge and an oppositely disposed material intercepting edge may be selectively and reversibly coupled at its handle attachment edge to the distal end of the elongate handle. In use, the material facing surface of the scoop may be selectively positioned both toward and away from the elongate handle as required for the particular application, and in a particular embodiment, a combined rake and shovel is disclosed having a reversible scoop which may be selectively reversed with respect to a common elongate handle in order to allow a user thereof to either pull or push material with the concave facing surface of the scoop. A lifting handle and turning grip may be added to the elongate handle to facilitate lifting and dumping of material held in the scoop with the aid of an additional end panel.

While there have been described the principals of the present invention in conjunction with specific apparatus, it is to be clearly understood that the foregoing description is made only by way of example and not as a limitation to the scope of the invention.

What is claimed is:

1. A manually operable combined rake and shovel, comprising;

an elongated handle having a distal end, a proximal end, and a central axis extending between said distal and proximal ends, a unitary scoop member comprising, a generally planar, rectangular, and rigid material-gathering member, said material-gathering member having a linear front edge, a linear back edge extending generally parallel to said front edge, and two parallel and linear side edges that extend generally perpendicular to said front and back edges, a generally planar, rectangular, and rigid handle-attaching member, said handle-attaching member having a linear bottom edge, a linear top edge extending generally parallel to said bottom edge, and two parallel and linear side edges that extend generally perpendicular to said bottom and top edges, said back edge of said material-gathering member being nonmovably fixed to said bottom edge of said handle-attaching member so as to cause said material-gathering member to extend generally perpendicular to said handle-attaching member, and so as to cause one side edge of said handle attaching member to be in general alignment with a corresponding side edge of said material-gathering member, and a generally planar and rigid end panel, said end panel having a linear bottom edge, and a linear back edge that meets said bottom edge at generally a right angle, said back edge of said end panel being nonmovably fixed to said one side edge of said handle-attaching member, and said bottom edge of said end panel being nonmovably fixed to said corresponding side edge of said material-gathering member, so as to cause said end panel to extend generally perpendicular to said handle-attaching member and to said material-gathering member, a first plurality of fastener openings formed in said handle-attachment member at a location generally adjacent to said top edge, and generally midway between said side edges, a generally planar and rigid bracket member nonmovably fixed to said distal end of said handle so as to extend at an angle to said handle axis, said bracket member having a top edge that defines an elongated top surface, said handle extending generally parallel to said handle axis, a second plurality of fastener openings formed in said bracket member, said second plurality of openings having a pattern that mates with said first plurality of fastener openings when said top edge of said bracket member is positioned generally adjacent to said top edge of said handle-attaching member, and said pattern of said second plurality of fastener openings being generally centered on said handle axis, and a plurality of manually removable and operable fasteners within said first and second plurality of fastener openings, said first and second plurality of fastener openings and said plurality of manually operable fasteners facilitating selective attachment of said scoop member to said handle in a shovel mode wherein said material-gathering member extends away from said handle, or in a rake mode wherein said material-gathering member extends toward said handle.

2. The combined rake and shovel of claim 1 including;

a lifting handle secured to said top surface of said handle at a point generally adjacent to said distal end, and a hand grip secured to said top surface of said handle at a point generally adjacent to said proximal end.

3. The combined rake and shovel of claim 2 including;

a first plurality of linearly aligned openings formed generally adjacent to said front edge of said material-gathering member, an elongated metal strip having a linear and front serrated edge, and having a linear back edge, a second plurality of linearly aligned openings formed within said metal strip generally adjacent to said back edge, said second plurality of linearly aligned openings being adapted to mate with said first plurality of linearly aligned openings, and a plurality of manually operable fasteners for cooperation with said first and second plurality of linearly aligned openings to facilitate securing of said metal strip to said front edge of said material-gathering member.

* * * * *